US011453973B2

(12) United States Patent
Bensel et al.

(10) Patent No.: US 11,453,973 B2
(45) Date of Patent: Sep. 27, 2022

(54) HEATER ASSEMBLY FOR AN APPLIANCE HAVING ONE OR MORE THERMOSTATS

(71) Applicant: Haier US Appliance Solutions, Inc., Wilmington, DE (US)

(72) Inventors: Peter Hans Bensel, Louisville, KY (US); Jason Eric Oakley, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 531 days.

(21) Appl. No.: 16/683,990

(22) Filed: Nov. 14, 2019

(65) Prior Publication Data
US 2021/0148038 A1    May 20, 2021

(51) Int. Cl.
*H05B 1/02* (2006.01)
*F24H 3/04* (2022.01)
(Continued)

(52) U.S. Cl.
CPC .............. *D06F 58/26* (2013.01); *D06F 58/30* (2020.02); *F24H 3/0405* (2013.01); *G01K 13/024* (2021.01); *H05B 1/0272* (2013.01); *H05B 3/06* (2013.01); *D06F 2103/32* (2020.02); *D06F 2105/28* (2020.02); *H05B 2203/022* (2013.01); *H05B 2203/036* (2013.01)

(58) Field of Classification Search
None
See application file for complete search history.

(56) References Cited

U.S. PATENT DOCUMENTS 2,621,423 A * 12/1952 Clark ...................... D06F 34/26
219/486
2,697,164 A * 12/1954 Andrews ............... F24H 3/0411
219/486
(Continued)

FOREIGN PATENT DOCUMENTS

EP    2206821 A1 *  7/2010  ............. D06F 25/00

OTHER PUBLICATIONS

Appliance parts.com, Whirlpool Dryer Replace Thermostat & Thermal Fuse, https://www.repairclinic.com/PartDetail/Thermal-Fuse/279816/2651, 5 pages.
(Continued)

*Primary Examiner* — Joseph M. Pelham
(74) *Attorney, Agent, or Firm* — Dority & Manning, P.A.

(57) ABSTRACT

A heater assembly or dryer appliance, as provided herein, may include a housing, a heating element, and a thermostat. The housing may have an outer surface and an inner surface. The inner surface may define a chamber, an inlet, and an outlet. The housing may further include an embossing mount extending radially outward along the outer surface. The heating element may be disposed within the chamber to selectively heat air in a flow of heated air from the inlet to the outlet. The thermostat may be mounted on the outer surface of the housing. The thermostat may include a probe, a first mounting tab, and a second mounting tab. The probe may be positioned in thermal communication with the chamber. The first mounting tab may be secured to the embossing mount. The second mounting tab may be held against the outer surface.

18 Claims, 12 Drawing Sheets

(51) Int. Cl.
*F24H 9/20* (2022.01)
*G01K 1/14* (2021.01)
*G01K 1/20* (2006.01)
*G01K 13/02* (2021.01)
*H05B 3/06* (2006.01)
*D06F 58/26* (2006.01)
*D06F 58/30* (2020.01)
*G01K 13/024* (2021.01)
*D06F 103/32* (2020.01)
*D06F 105/28* (2020.01)

(56) References Cited

U.S. PATENT DOCUMENTS

| | | | | |
|---|---|---|---|---|
| 2,782,991 A * | 2/1957 | Allen | | F24H 9/2064 |
| | | | | 415/19 |
| 2,941,308 A * | 6/1960 | Cobb | | D06F 58/50 |
| | | | | 34/552 |
| 2,988,626 A * | 6/1961 | Buttner | | F24H 3/0411 |
| | | | | 392/363 |
| 3,147,368 A * | 9/1964 | Walker | | F04D 17/04 |
| | | | | 415/203 |
| 3,718,982 A * | 3/1973 | Deaton | | D06F 58/22 |
| | | | | 219/400 |
| 4,518,847 A * | 5/1985 | Horst, Sr. | | F24H 3/081 |
| | | | | 237/16 |
| 5,329,098 A * | 7/1994 | Howard | | F24H 9/1818 |
| | | | | 392/350 |
| 6,087,636 A * | 7/2000 | Faries, Jr. | | A61B 46/10 |
| | | | | 219/439 |
| 6,091,888 A * | 7/2000 | Jane | | F24H 9/2071 |
| | | | | 392/375 |
| 6,169,850 B1 * | 1/2001 | Menassa | | F24H 9/2071 |
| | | | | 392/350 |
| 7,149,416 B2 * | 12/2006 | Nawrot | | F24H 3/0405 |
| | | | | 392/350 |
| 7,560,667 B2 * | 7/2009 | Kammer | | A61M 5/44 |
| | | | | 219/439 |
| 8,138,454 B2 * | 3/2012 | Kammer | | A61B 46/10 |
| | | | | 236/1 C |
| 8,148,666 B2 * | 4/2012 | Faries, Jr. | | A61F 7/0085 |
| | | | | 219/439 |
| 8,153,937 B2 * | 4/2012 | Faries | | A61B 50/22 |
| | | | | 219/439 |
| 8,309,891 B2 * | 11/2012 | Kammer | | A61M 3/0245 |
| | | | | 219/432 |
| 8,555,522 B2 * | 10/2013 | Bellinger | | D06F 34/26 |
| | | | | 219/506 |
| 9,869,053 B2 | 1/2018 | James et al. | | |
| 11,174,587 B2 * | 11/2021 | Bensel | | D06F 58/02 |
| 2006/0034593 A1 * | 2/2006 | Rapoza | | D06F 58/26 |
| | | | | 392/350 |
| 2008/0205481 A1 * | 8/2008 | Faries | | G01K 1/146 |
| | | | | 374/138 |
| 2009/0119944 A1 | 5/2009 | Lee et al. | | |
| 2012/0110869 A1 * | 5/2012 | Bellinger | | D06F 58/38 |
| | | | | 34/427 |
| 2014/0034631 A1 * | 2/2014 | James | | H05B 1/0272 |
| | | | | 219/520 |
| 2014/0041849 A1 * | 2/2014 | Mulder | | F24F 11/70 |
| | | | | 165/259 |
| 2016/0298862 A1 * | 10/2016 | Henderson | | F24H 3/0411 |

OTHER PUBLICATIONS

Fast Shipping Repair Clinic, Dryer heating element (part 279838)—how to replace, https://www.appliancepartspros.com/whirlpool-direct-connect-hi-wp3977767-ap6009043.html, 2 pages.

\* cited by examiner

HEATER ASSEMBLY FOR AN APPLIANCE HAVING ONE OR MORE THERMOSTATS

FIELD OF THE INVENTION

The present subject matter relates generally to heater assemblies for an appliance, such as a dryer appliance.

BACKGROUND OF THE INVENTION

Dryer appliances generally include a cabinet with a drum rotatably mounted therein. Dryer appliances also generally include a heater assembly that passes heated air through the drum in order to dry moisture laden articles disposed within the drum. For instance, the heater assembly may include a housing that encloses one or more heating elements while permitting air to pass therethrough. The temperature of heated air generated by the heater assembly can be monitored and regulated with a thermostat. In particular, the thermostat can be configured to trip and terminate further temperature increases within the heater assembly at a set point or temperature (e.g., in order to hinder or prevent the heater assembly from overheating).

Existing appliances and dryer appliances can have a number of drawbacks. For instance, the temperature measured by the thermostat can lag behind the actual temperature of the heated air when there is poor airflow through the heater assembly and the heater assembly is rapidly increasing in temperature. In order to compensate for such lag, the set point can be fixed at a value lower than the desired steady state temperature of the heater assembly. Conversely, when there is good airflow through the heater assembly and the thermostat does not need to trip, the thermostat reaches the set point and terminates further temperature increases within the heater assembly despite the heater assembly not operating at the desired steady state temperature.

Separate from or in addition to difficulties obtaining an accurate temperature measurement, issues may arise with securing a thermostat to a heater assembly. Typical methods or assemblies for mounting a thermostat require multiple screws or bolts that have to be individually aligned on the housing and the thermostat. Using such methods can be very tedious, though, and often increases the time, difficulty, or expense for assembling an appliance.

As a result, it would be useful to have an appliance or heater assembly that addresses one or more of the above issues. In particular, it would be advantageous if a heater assembly included one or more features that aided in aligning or assembling a thermostat on a heater housing (e.g., such that the process of assembly was made easier, more efficient, or more easily resulted in a suitable end product).

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a heater assembly for an appliance is provided. The heater assembly may include a housing, a heating element, and a thermostat. The housing may have an outer surface and an inner surface. The inner surface may define a chamber, an inlet, and an outlet. The chamber may extend along an axial direction from the inlet to the outlet. The housing may further include an embossing mount extending radially outward along the outer surface. The heating element may be disposed within the chamber to selectively heat air in a flow of heated air from the inlet to the outlet. The thermostat may be mounted on the outer surface of the housing. The thermostat may include a probe, a first mounting tab, and a second mounting tab. The probe may be positioned in thermal communication with the chamber. The first mounting tab may be secured to the embossing mount. The second mounting tab may be held against the outer surface.

In one exemplary aspect of the present disclosure, a dryer appliance is provided. The dryer appliance may include a cabinet, a drum, and a heater assembly. The cabinet may define an interior. The drum may be positioned within the interior. The drum may define a drying chamber for receipt of articles for drying. The heater assembly may be mounted within the cabinet in fluid communication with the drum to heat air thereto. The heater assembly may include a housing, a heating element, and a thermostat. The housing may have an outer surface and an inner surface. The inner surface may define a chamber, an inlet, and an outlet. The chamber may extend along an axial direction from the inlet to the outlet. The housing may further include an embossing mount extending radially outward along the outer surface. The heating element may be disposed within the chamber to selectively heat air in a flow of heated air from the inlet to the outlet. The thermostat may be mounted on the outer surface of the housing. The thermostat may include a probe, a first mounting tab, and a second mounting tab. The probe may be positioned in thermal communication with the chamber. The first mounting tab may be secured to the embossing mount. The second mounting tab may be held against the outer surface.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "or" is generally intended to be inclusive (i.e., "A or B" is intended to mean "A or B or both"). The terms "first," "second," and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

Figure 1:
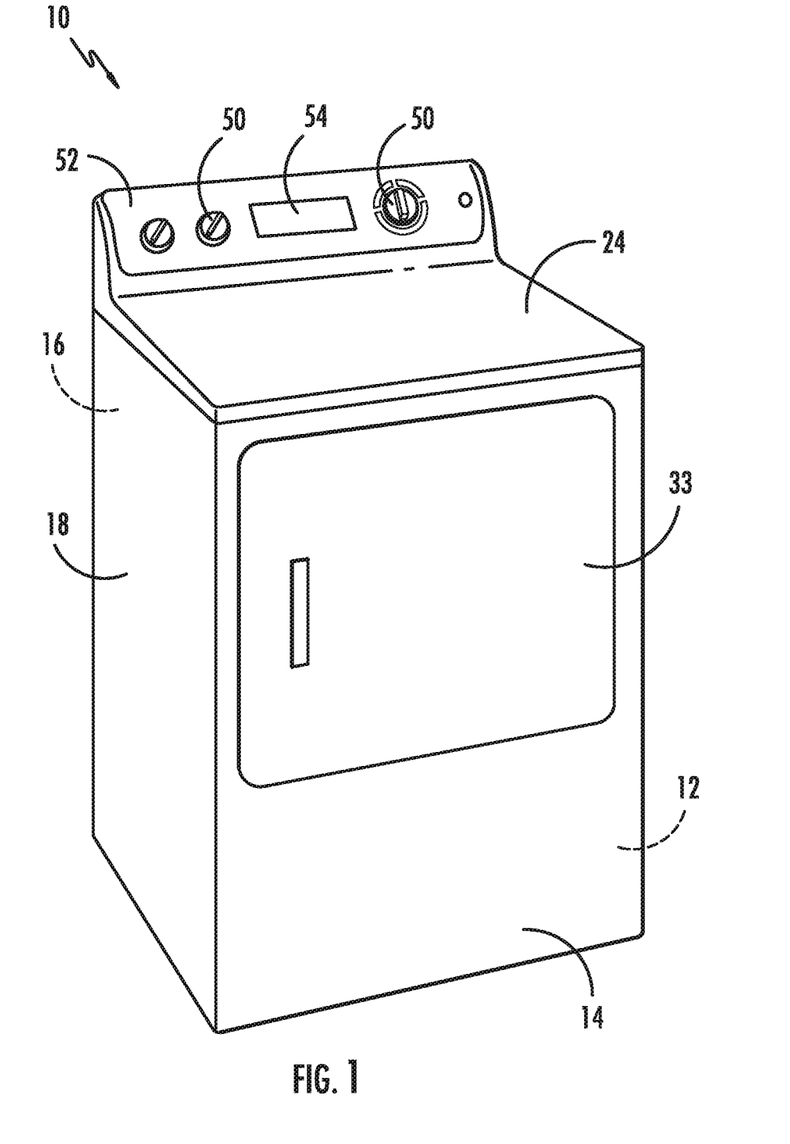
FIG. 1 provides a perspective view of a dryer appliance according to exemplary embodiments of the present disclosure.
Figure 2:
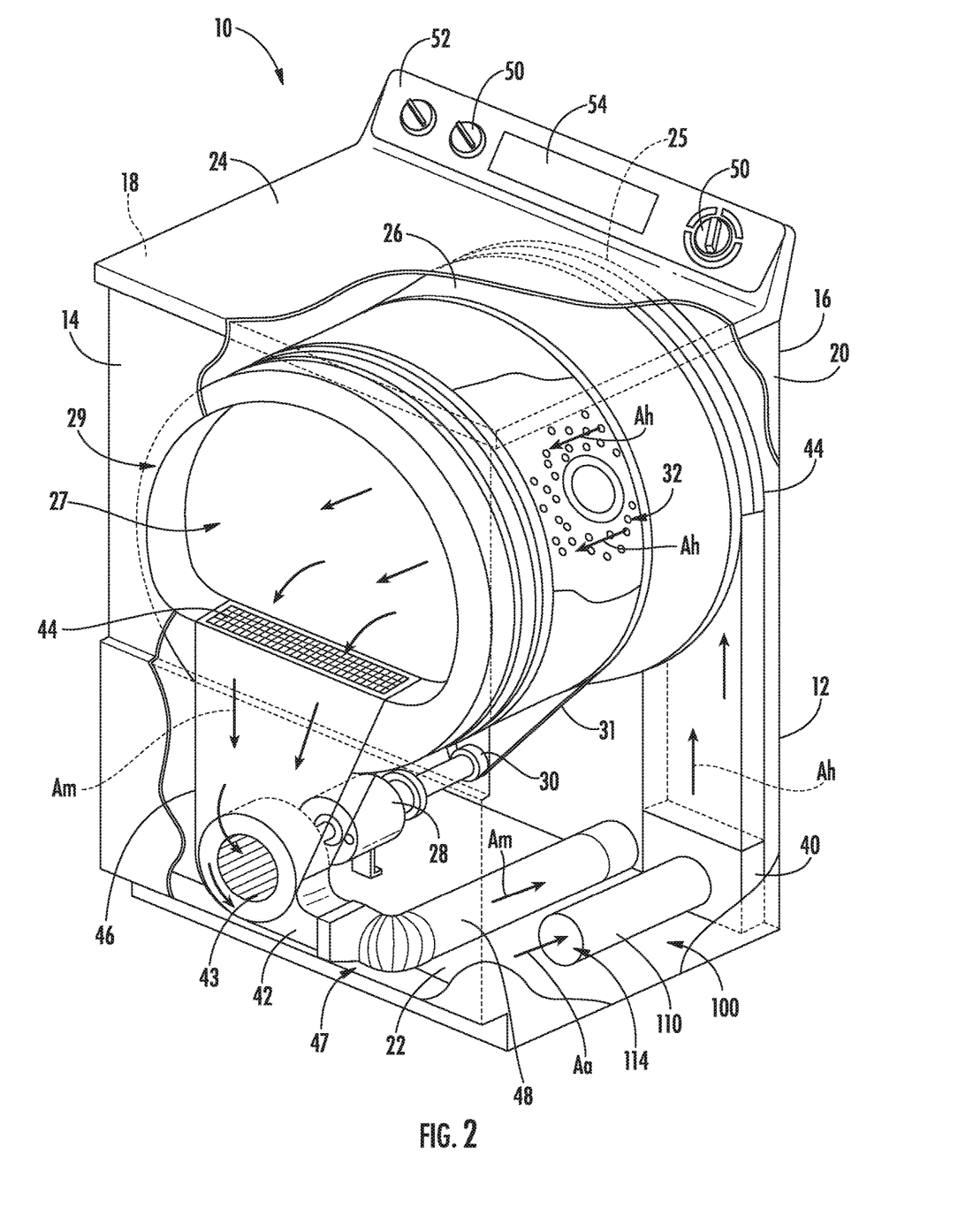
FIG. 2 provides a perspective view of the dryer appliance of FIG. 1 with a portion of the cabinet removed to reveal internal components of the dryer appliance.

Turning now to the figures, FIGS. 1 and 2 illustrate a dryer appliance 10 according to an exemplary embodiment of the present subject matter. While described in the context of a specific embodiment of dryer appliance 10, using the teachings disclosed herein it will be understood that dryer appliance 10 is provided by way of example only. Other dryer appliances having different appearances and different features may also be utilized with the present disclosure.

Dryer appliance 10 includes a cabinet 12 having a front panel 14, a rear panel 16, a pair of side panels 18 and 20 spaced apart from each other by front and rear panels 14 and 16, a bottom panel 22, and a top cover 24. Within cabinet 12 is a drum or container 26 mounted for rotation about a substantially horizontal axis. Drum 26 is generally cylindrical in shape and defines a drying chamber 27 for receipt of articles for drying. For example, dryer appliance 10 shown in FIGS. 1 and 2 is an electric dryer appliance with electrical heating elements. However, in alternative exemplary embodiments, dryer appliance 10 may be a gas dryer appliance with gas heating elements (e.g., gas burners) for heating air.

Drum 26 defines an opening 29 for permitting access to the chamber 27 of drum 26. Thus, opening 29 of drum 26 generally permits loading and unloading of clothing articles and other fabrics from chamber 27 of drum 26. A door 33 is rotatably mounted at opening 29 and selectively hinders access to chamber 27 of drum 26 through opening 29.

Drum 26 includes a rear wall 25 rotatably supported within cabinet 12 by a suitable fixed bearing. Rear wall 25 can be fixed or can be rotatable. A motor 28 rotates the drum 26 about the horizontal axis through a pulley 30 and a belt 31. Motor 28 is also in mechanical communication with an air handler 42 such that motor 28 rotates a fan assembly 43 (e.g., a centrifugal fan assembly) of air handler 42. Air handler 42 is configured for drawing air through chamber 27 of drum 26 (e.g., in order to dry articles located therein). In alternative exemplary embodiments, dryer appliance 10 includes an additional motor (not shown) for rotating fan assembly 43 of air handler 42 independently of drum 26.

Drum 26 is configured to receive heated air that has been heated by a heater assembly 100 (e.g., in order to dry damp articles disposed within chamber 27 of drum 26). Heater assembly 100 includes a housing 110. As discussed above, during operation of dryer appliance 10, motor 28 rotates drum 26 and fan assembly 43 of air handler 42 such that air handler 42 draws air through chamber 27 of drum 26 when motor 28 rotates fan assembly 43. In particular, ambient air, shown with arrow $A_a$, enters housing 110 of heater assembly 100 via an inlet 114 due to air handler 42 urging such ambient air $A_a$ into inlet 114. Such ambient air $A_a$ is heated within housing 110 and exits housing 110 as heated air, shown with arrow $A_h$, as discussed in greater detail below. Air handler 42 draws such heated air $A_h$ through a back duct 40 to drum 26. The heated air $A_h$ enters drum 26 through a plurality of holes 32 defined in rear wall 25 of drum 26.

Within chamber 27, the heat air An can accumulate moisture (e.g., from damp articles disposed within chamber 27). In turn, air handler 42 draws moisture statured air, shown as arrow $A_m$, through a screen filter 44 which traps lint particles. Such moisture statured air $A_m$ then enters a front duct 46 and is passed through air handler 42 to an exhaust duct 48. From exhaust duct 48, such moisture statured air $A_m$ passes out of clothes dryer 10 through a vent 49 defined by cabinet 12.

In some embodiments, a cycle selector knob 50 is mounted on a cabinet backsplash 52 and is in communication with a controller 54. Signals generated in controller 54 operate motor 28 and heater assembly 100 in response to a position of selector knob 50. Alternatively, a touch screen type interface may be provided. As used herein, "processing device" or "controller" may refer to one or more microprocessors or semiconductor devices and is not restricted necessarily to a single element. The processing device can be programmed to operate dryer appliance 10. The processing device may include, or be associated with, one or memory elements, such as electrically erasable, programmable read only memory (EEPROM).

Figure 3:
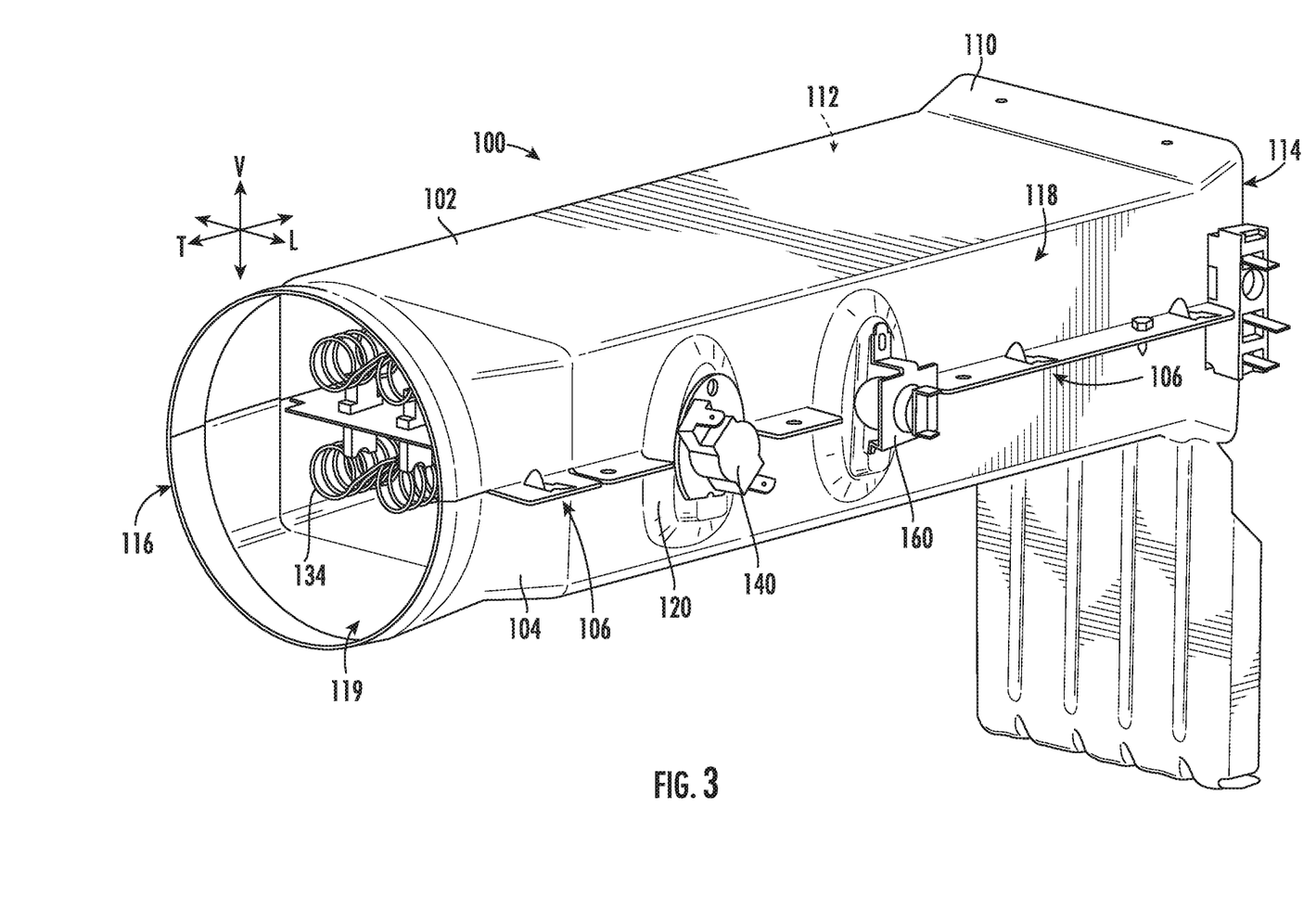
FIG. 3 provides a perspective view of a heater assembly of the exemplary dryer appliance of FIG. 2.

FIG. 3 provides a perspective view of heater assembly 100 and housing 110 removed from dryer appliance 10 (FIG. 1). As shown, housing 110 generally extends along an axial direction X. Moreover, housing 110 may define its own independent mutually perpendicular vertical direction V, lateral direction L, and transverse direction T. In some such embodiments, the transverse direction T is defined parallel to the axial direction X, while the vertical direction V and lateral direction L are perpendicular to the axial direction X.

Figure 10:
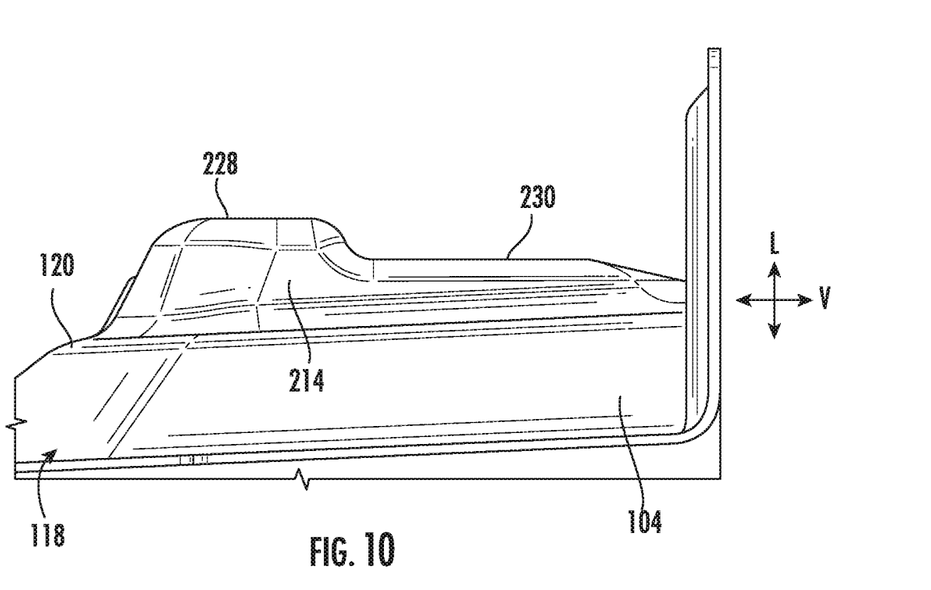
FIG. 10 provides a rear perspective view of the exemplary housing of FIG. 9.

In optional embodiments, housing 110 includes an upper housing portion 102 (e.g., second housing portion) and a lower housing portion 104 (e.g., first housing portion). Upper housing portion 102 and lower housing portion 104 may be selectively secured together, such as via one or more clamping joints 106 (or another suitable fastener), to form housing 110. Alternatively, housing 110 may be formed as an integral or unitary single piece member about a chamber 112 to which a burner or hood may be fastened (see e.g., FIG. 10).

Generally, housing 110 (e.g., the assembled upper housing portion 102 and lower housing portion 104) defines a chamber 112. Housing 110 also defines inlet 114 and an outlet 116. In some embodiments, inlet 114 and outlet 116 are longitudinally spaced apart from one another (e.g., along the axial direction X) such that inlet 114 and outlet 116 are disposed on opposite ends of housing 110. The chamber 112 of housing 110 extends between inlet 114 and outlet 116 along the axial direction X such that inlet 114 and outlet 116 are in fluid communication via chamber 112. Thus, inlet 114 of housing 110 and outlet 116 of housing 110 may permit fluid (e.g., air) to flow longitudinally through chamber 112 of housing 110. For example, as discussed above, air handler 42 (FIG. 2) can draw ambient air $A_a$ into chamber 112 of housing 110 through inlet 114 of housing 110. Within chamber 112, such ambient air $A_a$ can be heated and exit chamber 112 of housing 110 through outlet 116 of housing 110 as heated air $A_h$.

When assembled, housing 110 also has an outer surface 118 and an inner surface 119. A mounting region 120 may be formed on housing 110 and, for example, extend away, from a surrounding portion of outer surface 118 of housing 110. In some embodiments, a thermostat 140 is mounted to mounting region 120. In further embodiments, an additional thermostat 160 is mounted to housing 110 upstream of thermostat 140.

In certain embodiments, thermostat 140 includes a support (e.g., formed as a circular plate or as a plate having any suitable shape). As will be further described below, the support of thermostat 140 may be fastened to housing 110 at mounting region 120. Generally, thermostat 140 is configured for measuring a temperature of air within chamber 112 of housing 110. Thus, thermostat 140 can include, for example, a thermocouple, thermistor, or resistance temperature detector. Thermostat 140 may be placed in communication with controller 54 (FIG. 1) such that controller 54 receives a voltage or current from thermostat 140 corresponding to the temperature of air within chamber 112 of housing 110. In particular, thermostat 140 includes a pair of blade connections 148 that may receive a wire or other suitable electrical conductor to place controller 54 and thermostat 140 in electrical communication.

Figure 4:
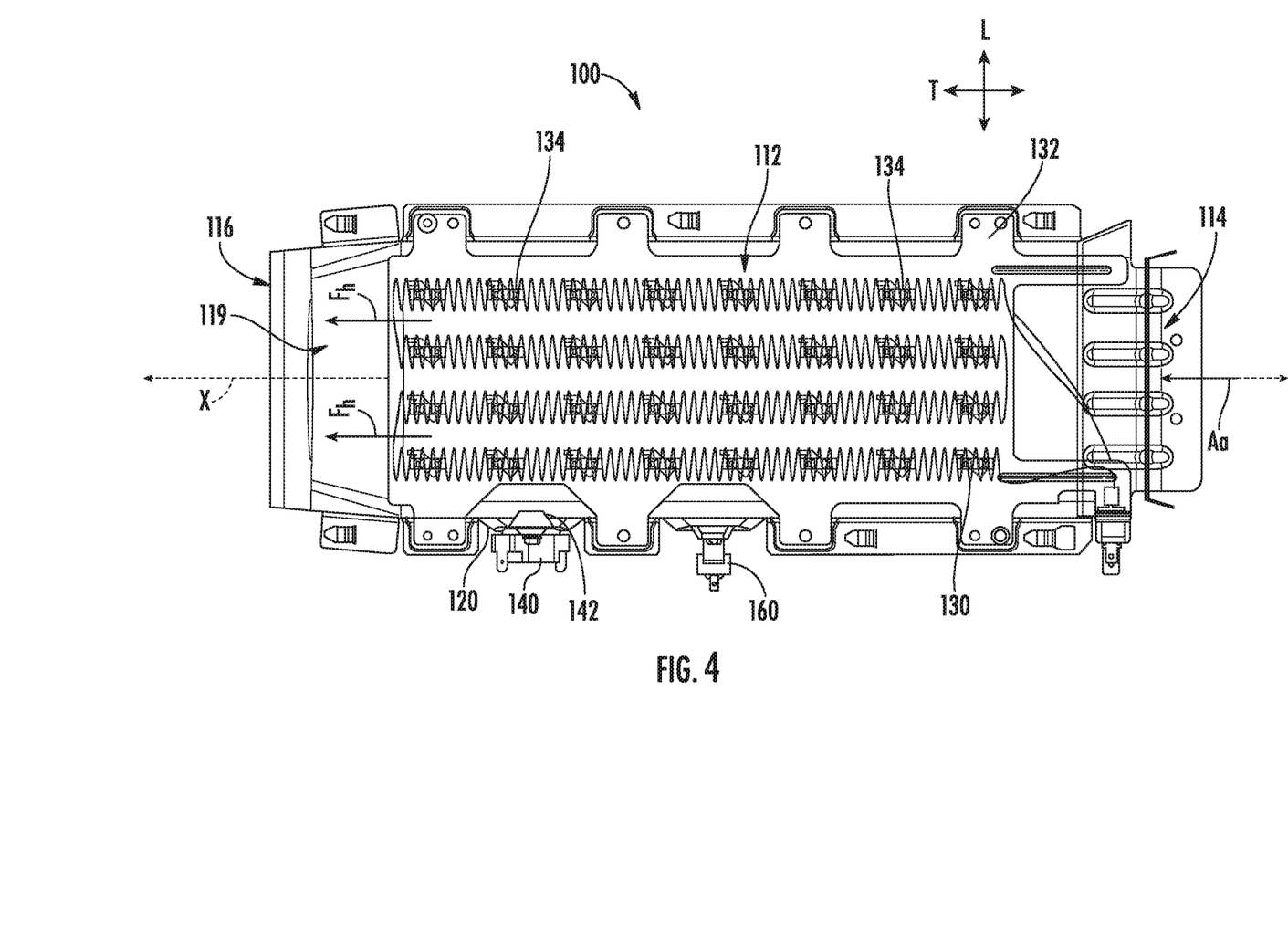
FIG. 4 provides a cross-sectional view of the exemplary heater assembly of FIG. 3.
Figure 5:
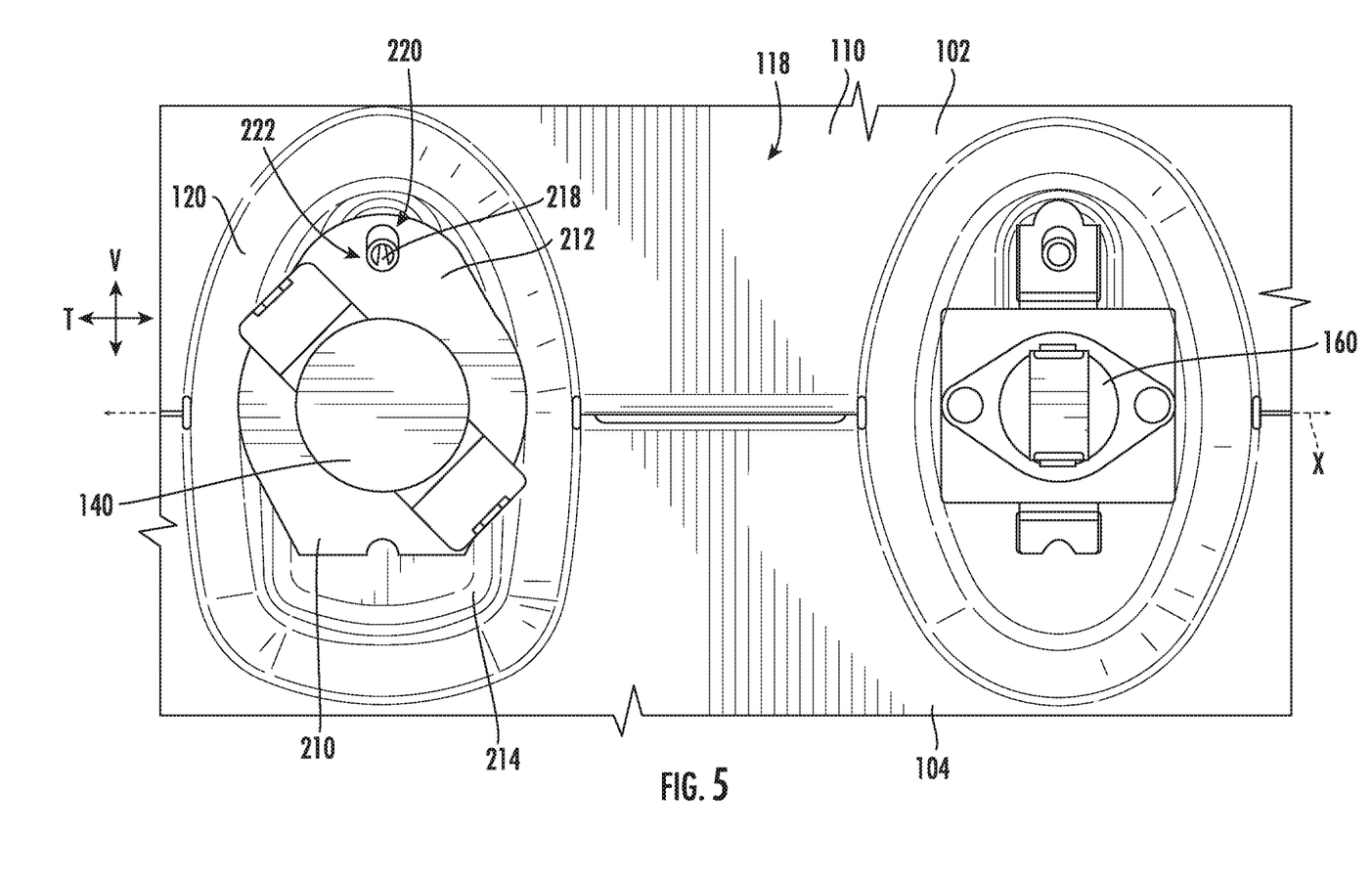
FIG. 5 provides a side perspective view of a portion of the exemplary heater assembly of FIG. 3.
Figure 6:
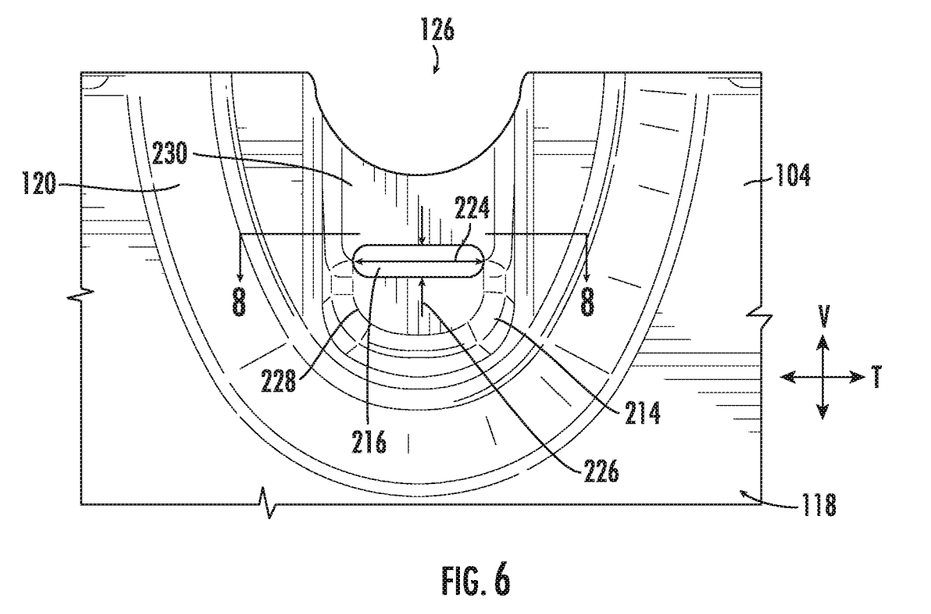
FIG. 6 provides a side perspective view of a portion of a housing for a heater assembly according to exemplary embodiments of the present disclosure.
Figure 7:
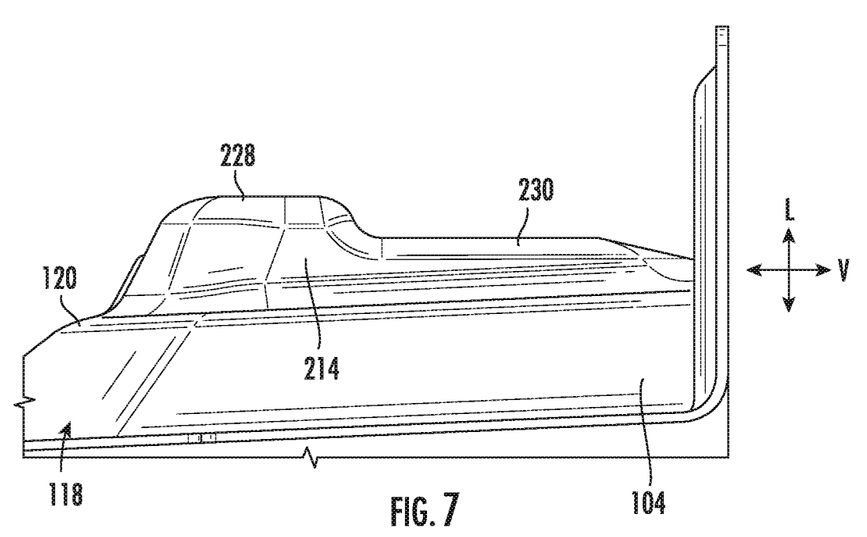
FIG. 7 provides a rear perspective view of the exemplary housing of FIG. 6.
Figure 8:
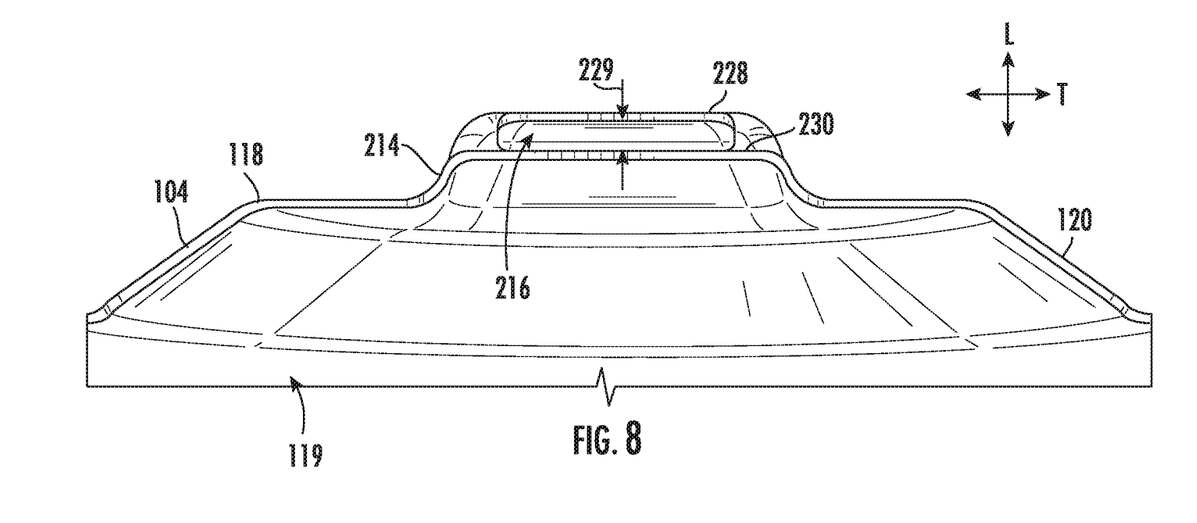
FIG. 8 provides a sectional view of the exemplary housing of FIG. 6 taken along the line 8-8.

FIG. 4 provides a cross-sectional view of heater assembly 100. As shown, in some embodiments, a heating element 130 is disposed within chamber 112 of housing 110. For instance, heating element 130 may be mounted to a plate 132 with brackets 134. In turn, plate 132 is mounted or secured to housing 110 (e.g., between upper housing portion 102 and lower housing portion 104).

As may be seen in FIG. 4, thermostat 140 includes a probe 142. Probe 142 of thermostat 140 is positioned in thermal communication (e.g., indirect conductive communication or direct fluid communication) with chamber 112 of housing 110. Optionally, at least a portion of probe 142 may be positioned within chamber 112. Probe 142 of thermostat 140 is also positioned proximate to an aperture 126 through housing 110 at mounting region 120. Further, aperture 126 of mounting region 120 is disposed upstream of probe 142 of thermostat 140 relative to the flow of heated air $F_h$ through chamber 112 of housing 110. Probe 142 of thermostat 140 may be exposed to air (e.g., heated air) within chamber 112 of housing 110. Thus, for example, a thermocouple within probe 142 of thermostat 140 can generate a voltage that corresponds to the temperature of the air within chamber 112 adjacent probe 142. Such voltage can be received by controller 54 (FIG. 1) in order to control dryer appliance 10 (FIG. 1) operations.

Heating element 130 is configured for heating air (e.g., ambient air $A_a$) that enters chamber 112 of housing 110 at inlet 114 of housing 110 in order to generate a flow of heated air, shown with arrows $F_h$. Flow of heated air $F_h$ exits chamber 112 of housing 110 at outlet 116 of housing 110 (e.g., as heated air $A_h$). In FIG. 4, heating element 130 is shown as an electrical resistance heating element. However, in alternative exemplary embodiments, heating element 130 may be any suitable type of heating element, such as a gas burner or combination of heating elements.

Turning now generally to FIGS. 5 through 15, several views are provided of portions of heater assembly 100 and in particular housing 110, according to various exemplary embodiments of the present disclosure.

As shown, housing 110 includes an embossing mount 214 (e.g., at mounting region 120) to which at least a portion of thermostat 140 may be secured. Generally, embossing mount 214 extends radially outward from chamber 112. A portion of embossing mount 214 may thus extend further outward from the axial direction X than a surrounding portion of outer surface 118.

In some embodiments, thermostat 140 includes a discrete first mounting tab 210 and second mounting tab 212. As shown, the mounting tabs 210, 212 may be spaced apart from each other (e.g., by 180°). For instance, the mounting tabs 210, 212 may extend from opposite ends of thermostat 140 (e.g., perpendicular to the axial direction X). When assembled, first mounting tab 210 may be secured to the embossing mount 214 as will be described in greater detail below. Optionally, second mounting tab 212 may be secured or attached to another portion of housing 110, such as against the outer surface 118. In embodiments wherein a separate first housing portion 104 and second housing portion 102 are included with housing 110, embossing mount 214 may be formed on one of the housing portions 102, 104. Thus, first mounting tab 210 may be secured to the same housing portion 102 or 104 as embossing mount 214, while second mounting tab 212 is attached or held against the opposite housing portion 104 or 102.

In certain embodiments, a mechanical radial fastener 218, such as a screw or bolt, secures second mounting tab 212 to housing 110. For instance, housing 110 may define a first fastener opening 220 through which radial fastener 218 may be received. The second mounting tab 212 may define a second fastener opening 222 through which radial fastener 218 may also be received. As shown, first fastener opening 220 may be parallel to or otherwise spaced apart from aperture 126 (e.g., along the vertical direction V). During assembly, the first and second fastener openings 220, 222 may be radially aligned with each other, thereby permitting radial fastener 218 to extend through the both second mounting tab 212 and housing 110. When assembled, the radial fastener 218 may then hold second mounting tab 212 against outer surface 118 (e.g., above or below the embossing mount 214).

Turning especially to FIGS. 5 through 10, embossing mount 214 may define a mounting slot 216 that extends through housing 110. Specifically, embossing mount 214 extends from the outer surface 118 to the inner surface 119. In other words, mounting slot 216 may generally extend radially inward toward the axial direction X. Mounting slot 216 may define dimensions of width 224 and length 226 (e.g., along the transverse direction T and vertical direction V, respectively). Moreover, mounting slot 216 may be spaced apart from the aperture 126 (e.g., in the vertical direction V) such that aperture 126 and mounting slot 216 are defined as discrete and isolated openings through housing 110 that are not continuous with each other.

In certain embodiments, embossing mount 214 further includes an expanded lip 228 extending radially outward from an embossing base 230. For instance, on one end of the length 226, mounting slot 216 may be defined by mounting base 236. By contrast, on the opposite end of length 226, mounting slot 216 may be defined by expanded lip 228. The distance between mounting base 236 and expanded lip 228 may define the dimension of depth 229 for mounting slot 216. In other words, the depth 229 of mounting slot 216 may be defined between the first lateral extrema (e.g., at the expanded lip 228) and a second lateral extrema (e.g., at mounting base 236). When assembled within an appliance, the end of mounting slot 216 that is defined by mounting base 236 (e.g., one vertical extrema) may be positioned above the end of mounting slot 216 that is defined by expanded lip 228 (e.g., another vertical extrema).

Figure 9:
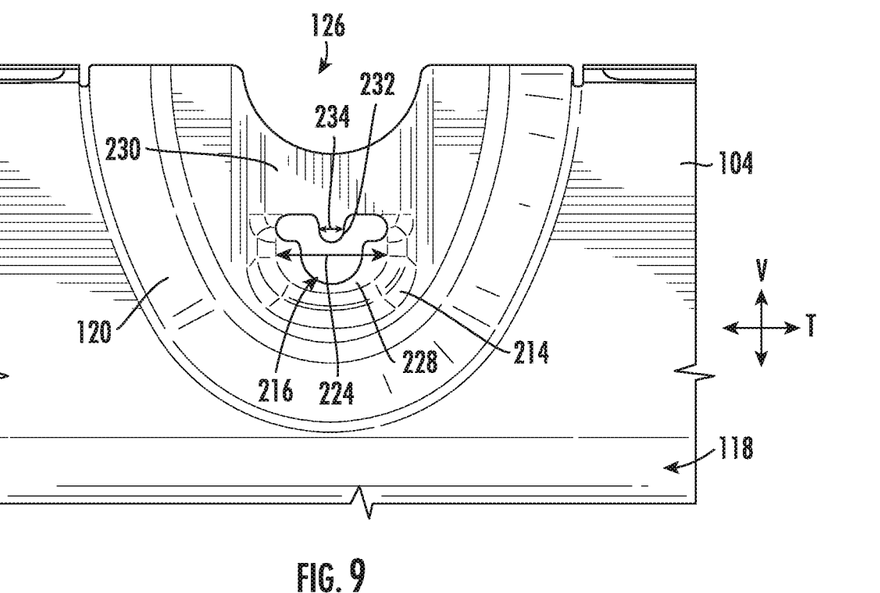
FIG. 9 provides a side perspective view of a portion of a housing for a heater assembly according to exemplary embodiments of the present disclosure.

Turning especially to FIG. 9, in optional embodiments, housing 110 further includes a guide tongue 232 defining at least a portion of mounting slot 216. For instance, guide tongue 232 may extend downward at one end of the length of mounting slot 216. In some such embodiments, guide tongue 232 extends vertically downward from mounting base 236 (e.g., generally towards expanded lip 228 along the vertical direction V). Guide tongue 232 may define a lateral extrema of mounting slot 216 (e.g., spaced apart from expanded lip 228). In some such embodiments, guide tongue 232 defines a tab width 234 within the slot width 224. Specifically, the tab width 234 may be less than the slot width 224. Advantageously, guide tongue 232 may influence or direct desired orientation of first mounting tab 210 within mounting slot 216.

Returning generally to FIGS. 5 through 10, first mounting tab 210 of thermostat 140 may be selectively received by or held within mounting slot 216. A mounted width of first mounting tab 210 may thus be less than width 224 of mounting slot 216. Moreover, first mounting tab 210 may extend from the outer surface 118, through mounting slot 216, and to chamber 112. In the exemplary embodiments of FIGS. 5 through 10, first mounting tab 210 further extends behind expanded lip 228 such that expanded lip 228 generally restricts radial movement of first mounting tab 210 away from housing 110. In optional embodiments, mounting slot 216 is positioned below first fastener opening 220.

During assembly, first mounting tab 210 may advantageously be supported in mounting slot 216 (e.g., in a position that radially aligns the first and second fastener openings 220, 222). In turn, an assembler may be free to insert a radial fastener 218 without also holding thermostat 140.

Figure 11:
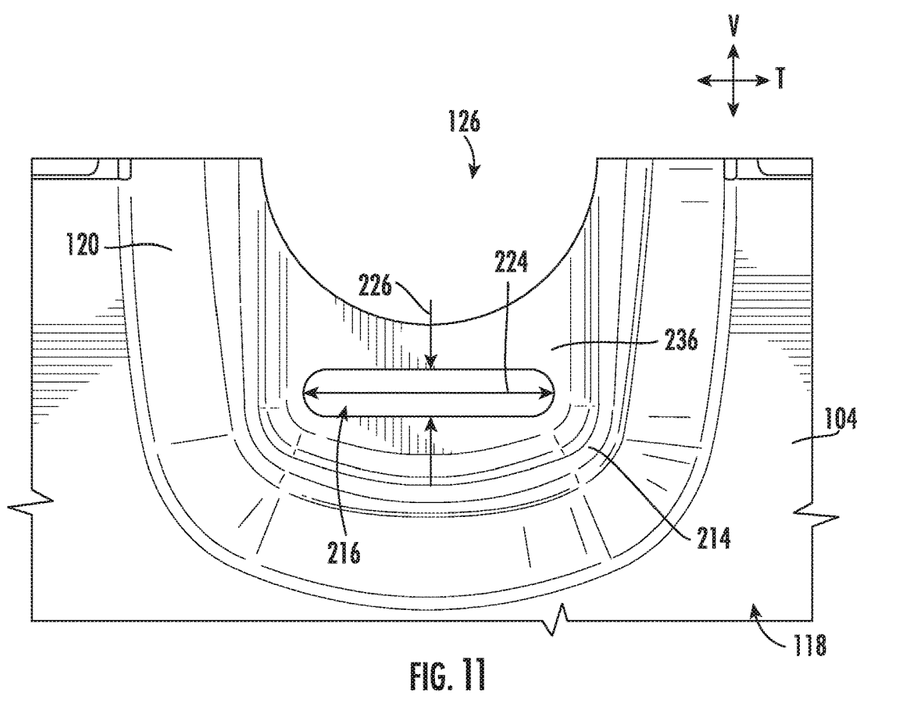
FIG. 11 provides a side perspective view of a portion of a housing for a heater assembly according to exemplary embodiments of the present disclosure.
Figure 12:
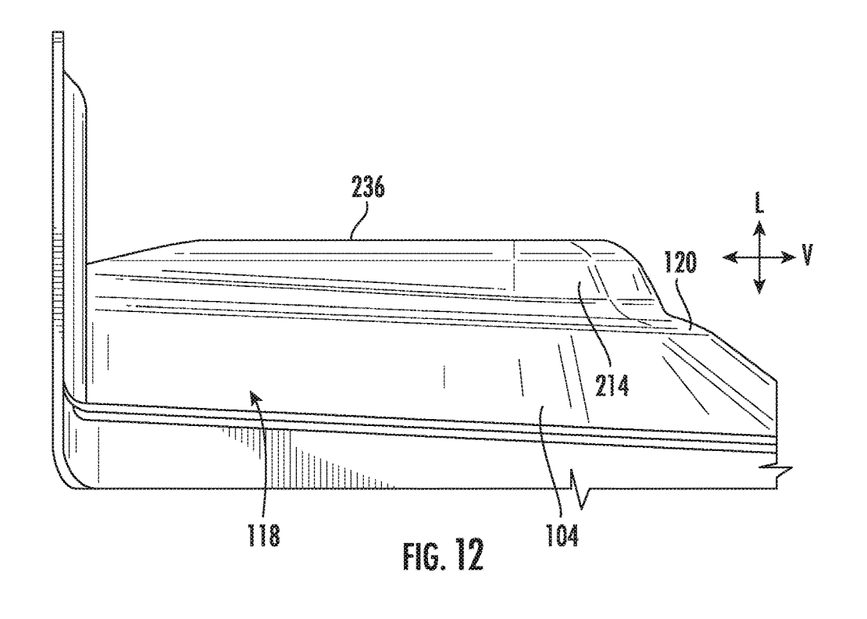
FIG. 12 provides a front perspective view of the exemplary housing of FIG. 11.

Turning especially to FIGS. 11 through 12, embossing mount 214 may define a mounting slot 216 that extends through housing 110. Specifically, embossing mount 214 extends from the outer surface 118 to the inner surface 119. In other words, mounting slot 216 may generally extend radially inward toward the axial direction X. Mounting slot 216 may define dimensions of width 224 and length 226 (e.g., along the transverse direction T and vertical direction V, respectively). Moreover, mounting slot 216 may be spaced apart from the aperture 126 (e.g., in the vertical direction V) such that aperture 126 and mounting slot 216 are defined as discrete and isolated openings through housing 110 that are not continuous with each other.

In certain embodiments, mounting slot 216 is defined through a flat continuous mounting base 236. The perimeter or shape of mounting slot 216 may thus be defined on a flat plane, as shown. When assembled, first mounting tab 210 of thermostat 140 may be selectively received by or held within mounting slot 216. A mounted width of first mounting tab 210 may thus be less than width 224 of mounting slot 216. Moreover, first mounting tab 210 may extend from the outer surface 118, through mounting slot 216, and to chamber 112. For instance, first mounting tab 210 may be bent inward toward the chamber 112. Thus, first mounting tab 210 may extend in front of one portion of the mounting base 236 while being behind another portion of mounting base 236 such that the mounting base 236 generally restricts radial movement of first mounting tab 210 away from housing 110.

Figure 13:
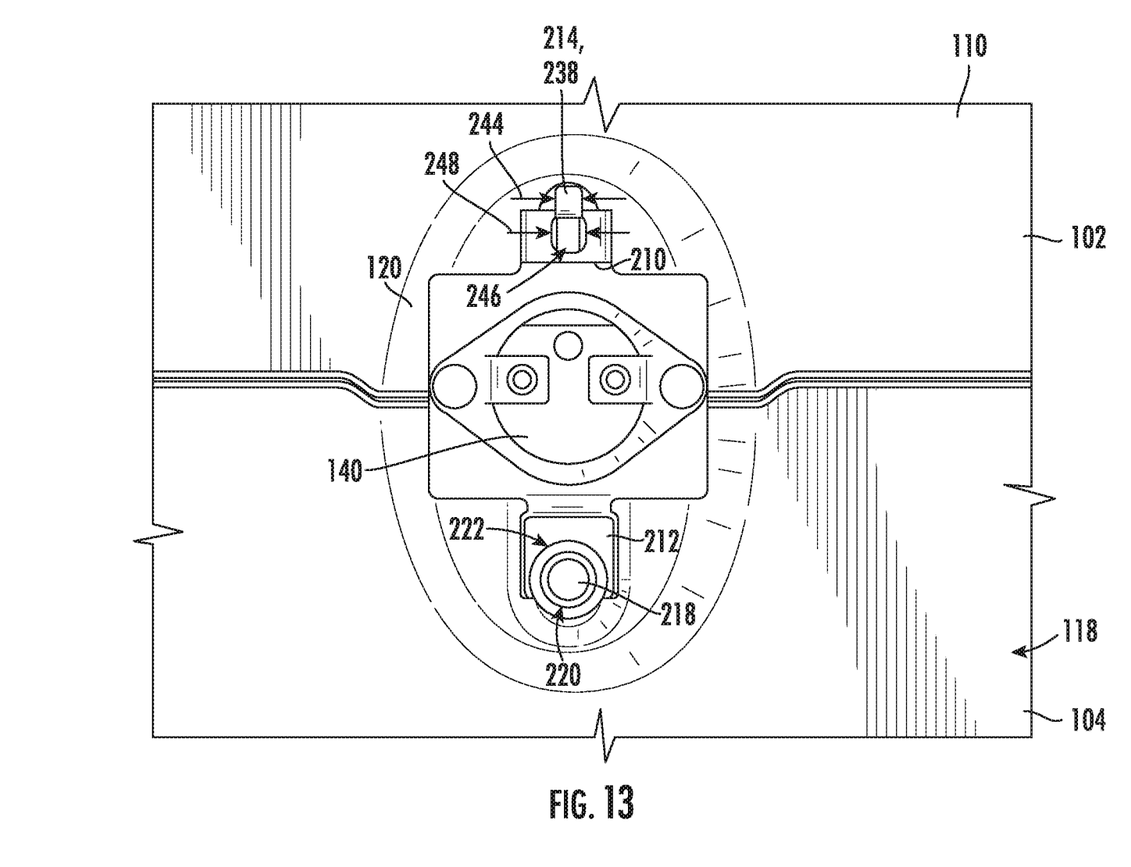
FIG. 13 provides a side perspective view of a portion of a heater assembly according to exemplary embodiments of the present disclosure.
Figure 14:
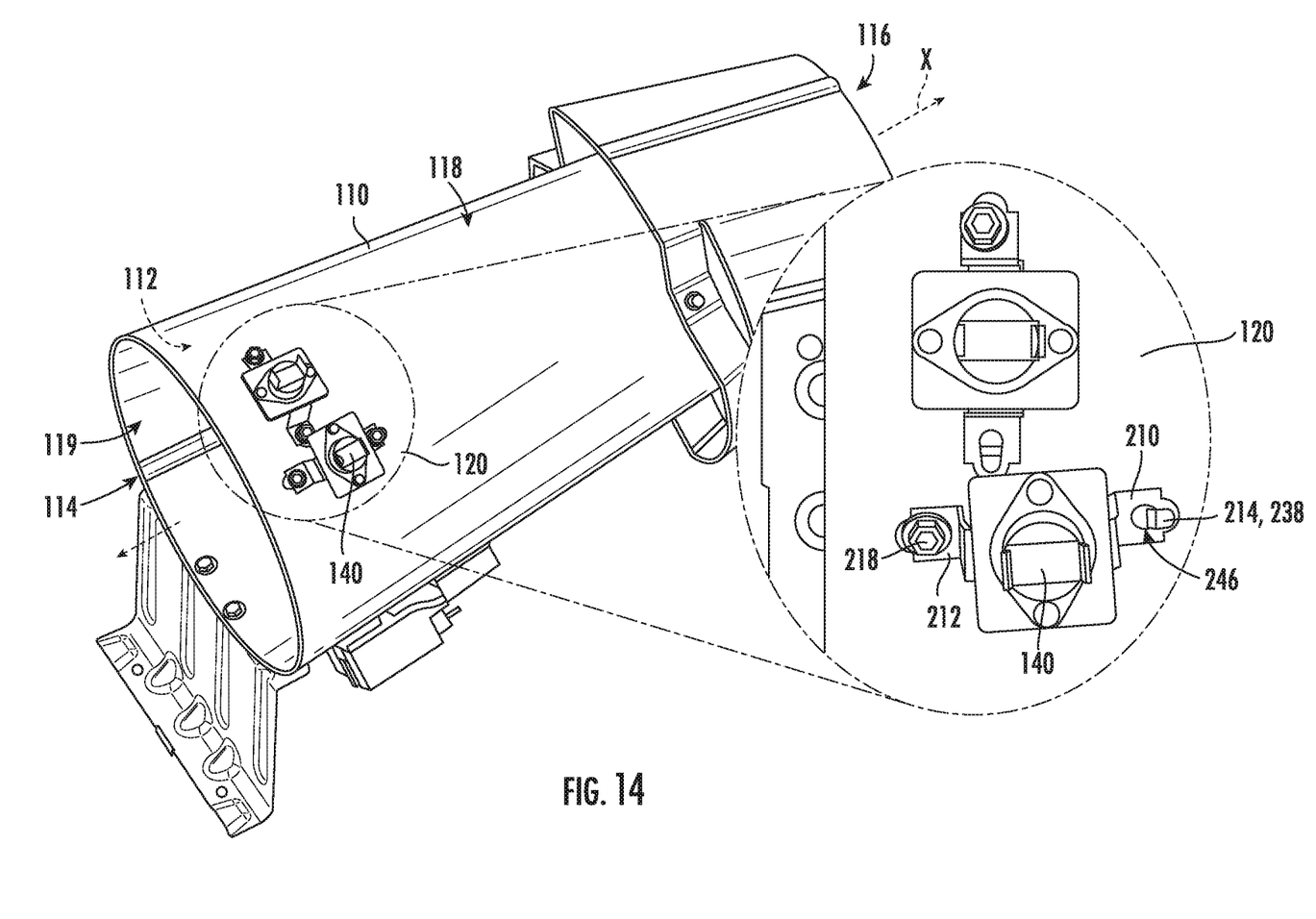
FIG. 14 provides a perspective view of a portion of a heater assembly according to exemplary embodiments of the present disclosure, including a magnified portion showing multiple mounted thermostats.
Figure 15:
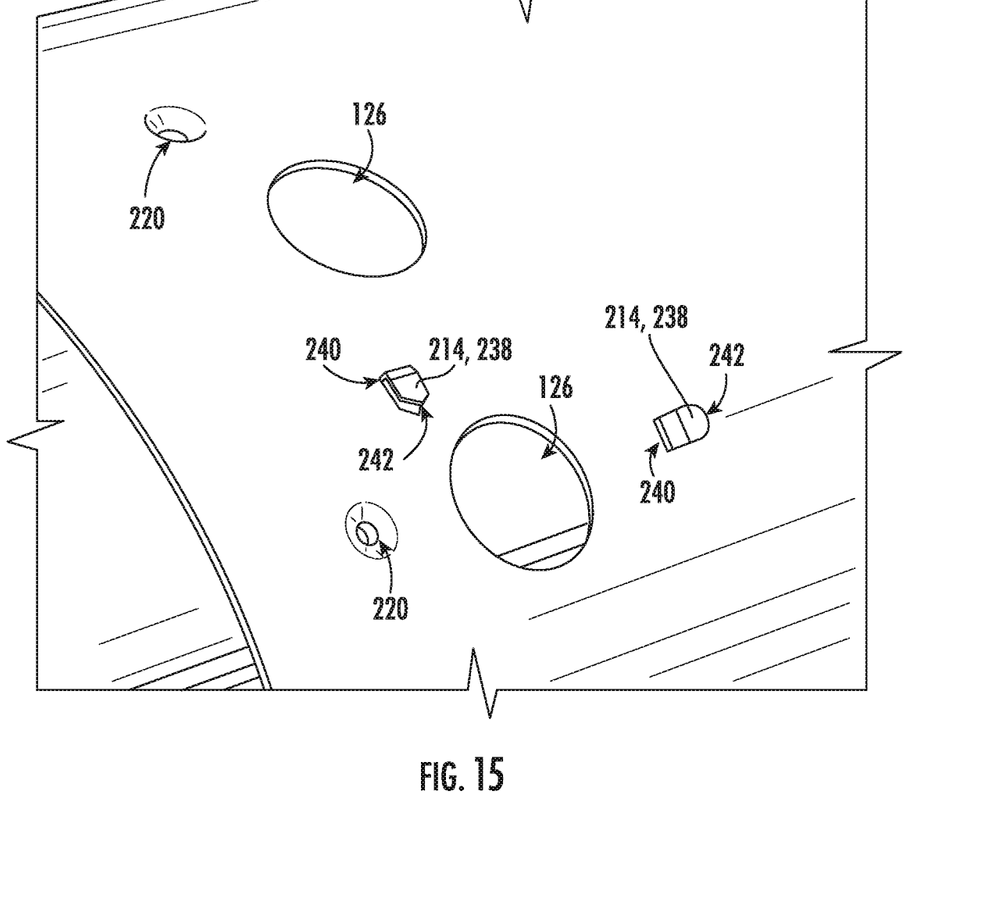
FIG. 15 provides a magnified perspective view of a portion of the housing of the exemplary heater assembly of FIG. 14.

Turning especially to FIGS. 13 through 15, embossing mount 214 may define a radial hook 238 that generally extends away from chamber 112. For instance, radial hook 238 may extend outward and upward from a source end 240 proximal to chamber 112 to a free end 242 distal to chamber 112. Radial hook 238 may define a maximum width 244 between the source end 240 and the free end 242. Optionally, the width (e.g., at the maximum width 244) of radial hook 238 may be generally continuous from source end 240 to free end 242.

In some such embodiments, first mounting tab 210 defines a catch opening 246. Catch opening 246 may define an opening width or diameter 248. This diameter 248 may be larger than the maximum width 244 radial hook 238. When assembled, radial hook 238 may extend through catch opening 246. Moreover radial hook 238 may hold first mounting tab 210 against housing 110. In optional embodiments, radial hook 238 is positioned above the first fastener opening 220.

During assembly, first mounting tab 210 may advantageously be fully supported on radial hook 238 (e.g., in a position that radially aligns the first and second fastener openings 220, 222). In turn, an assembler may be free to insert a radial fastener 218 without also holding thermostat 140.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A heater assembly for an appliance, the heater assembly comprising:
 a housing having an outer surface and an inner surface, the inner surface defining a chamber, an inlet, and an outlet, the chamber extending along an axial direction from the inlet to the outlet, and the housing further comprising an embossing mount extending radially outward along the outer surface;
 a heating element disposed within the chamber to selectively heat air in a flow of heated air from the inlet to the outlet; and a thermostat mounted on the outer surface of the housing, the thermostat comprises a probe, a first mounting tab, and a second mounting tab, the probe being positioned in thermal communication with the chamber, the first mounting tab being secured to the embossing mount, and the second mounting tab being held against the outer surface.

2. The heater assembly of claim 1, wherein the housing comprises a first housing portion and a second housing portion selectively secured to the first housing portion, the first and second housing portions defining the chamber, the first and second housing portions also defining the inlet and the outlet.

3. The heater assembly of claim 2, wherein the embossing mount is formed on one of the first housing portion or the second housing portion, and wherein the second mounting tab is held against an opposite one of the first housing portion or the second housing portion.

4. The heater assembly of claim 1, wherein the embossing mount defines a mounting slot extending from the outer surface to the inner surface, and wherein the first mounting tab is held within the mounting slot.

5. The heater assembly of claim 4, wherein the mounting slot defines a slot width along a transverse direction parallel to the axial direction, wherein the housing further defines a guide tongue defining a lateral extrema of the mounting slot, wherein the guide tongue defines a tongue width along the transverse direction, and wherein the tongue width is less than the slot width.

6. The heater assembly of claim 1, wherein the embossing mount defines a radial hook, wherein the first mounting tab defines a catch opening, and wherein the radial hook extends through the catch opening.

7. The heater assembly of claim 1, wherein the housing further defines a first fastener opening, wherein the second mounting tab defines a second fastener opening, the second fastener opening being radially aligned with the first fastener opening, and wherein the heater assembly further comprises a radial fastener extending through the first and second fastener openings.

8. The heater assembly of claim 7, wherein the embossing mount defines a radial hook, wherein the first mounting tab defines a catch opening, wherein the radial hook is positioned above the first fastener opening, and wherein the radial hook extends through the catch opening.

9. The heater assembly of claim 7, wherein the embossing mount defines a mounting slot extending from the outer surface to the inner surface, wherein the mounting slot is positioned below the first fastener opening, and wherein the first mounting tab is held within the mounting slot.

10. A dryer appliance, comprising:
a cabinet defining an interior;
a drum positioned within the interior, the drum defining a drying chamber for receipt of articles for drying; and
a heater assembly mounted within the cabinet in fluid communication with the drum to heat air thereto, the heater assembly comprising
a housing having an outer surface and an inner surface, the inner surface defining a chamber, an inlet, and an outlet, the chamber extending along an axial direction from the inlet to the outlet, and the housing further comprising an embossing mount extending radially outward along the outer surface,
a heating element disposed within the chamber to selectively heat air in a flow of heated air from the inlet to the outlet, and
a thermostat mounted on the outer surface of the housing, the thermostat comprises a probe, a first mounting tab, and a second mounting tab, the probe being positioned in thermal communication with the chamber, the first mounting tab being secured to the embossing mount, and the second mounting tab being held against the outer surface.

11. The dryer appliance of claim 10, wherein the housing comprises a first housing portion and a second housing portion selectively secured to the first housing portion, the first and second housing portions defining the chamber, the first and second housing portions also defining the inlet and the outlet.

12. The dryer appliance of claim 11, wherein the embossing mount is formed on one of the first housing portion or the second housing portion, and wherein the second mounting tab is held against an opposite one of the first housing portion or the second housing portion.

13. The dryer appliance of claim 10, wherein the embossing mount defines a mounting slot extending from the outer surface to the inner surface, and wherein the first mounting tab is held within the mounting slot.

14. The dryer appliance of claim 13, wherein the mounting slot defines a slot width along a transverse direction parallel to the axial direction, wherein the housing further defines a guide tongue defining a lateral extrema of the mounting slot, wherein the guide tongue defines a tongue width along the transverse direction, and wherein the tongue width is less than the slot width.

15. The dryer appliance of claim 10, wherein the embossing mount defines a radial hook, wherein the first mounting tab defines a catch opening, and wherein the radial hook extends through the catch opening.

16. The dryer appliance of claim 10, wherein the housing further defines a first fastener opening, wherein the second mounting tab defines a second fastener opening, the second fastener opening being radially aligned with the first fastener opening, and wherein the heater assembly further comprises a radial fastener extending through the first and second fastener openings.

17. The dryer appliance of claim 16, wherein the embossing mount defines a radial hook, wherein the first mounting tab defines a catch opening, wherein the radial hook is positioned above the first fastener opening, and wherein the radial hook extends through the catch opening.

18. The dryer appliance of claim 16, wherein the embossing mount defines a mounting slot extending from the outer surface to the inner surface, wherein the mounting slot is positioned below the first fastener opening, and wherein the first mounting tab is held within the mounting slot.

* * * * *